United States Patent
Friswell

Patent Number: 6,150,306
Date of Patent: *Nov. 21, 2000

[54] FLUORESCENT TRACER DYES

[75] Inventor: Michael R. Friswell, Wayne, N.J.

[73] Assignee: Morton Internatioanl Inc., Chicago, Ill.

[*] Notice: This patent issued on a continued prosecution application filed under 37 CFR 1.53(d), and is subject to the twenty year patent term provisions of 35 U.S.C. 154(a)(2).

[21] Appl. No.: 09/262,729

[22] Filed: Mar. 4, 1999

[51] Int. Cl.[7] ............................ C10M 133/40; C09K 5/00
[52] U.S. Cl. .......................... 508/261; 508/266; 252/68; 546/100
[58] Field of Search .................................... 508/261, 266, 508/267; 252/68; 546/100

[56] References Cited

U.S. PATENT DOCUMENTS

| | | | |
|---|---|---|---|
| 2,006,017 | 6/1935 | Eckert et al. | 260/124 |
| 2,385,106 | 9/1945 | Somerville et al. | 260/281 |
| 2,415,373 | 2/1947 | Somerville et al. | 260/281 |
| 2,715,126 | 8/1955 | Mulvaney et al. | 260/281 |
| 2,914,531 | 11/1959 | Staeuble et al. | 260/249.5 |
| 3,310,564 | 3/1967 | Kasai et al. | 260/281 |
| 3,935,227 | 1/1976 | Wade et al. | 260/281 S |
| 4,040,968 | 8/1977 | Harris | 508/281 |
| 4,115,555 | 9/1978 | Wade et al. | 424/180 |
| 4,200,752 | 4/1980 | Berteison | 546/100 |
| 4,375,384 | 3/1983 | Molina | 156/626 |
| 4,575,480 | 3/1986 | Kotani et al. | 430/192 |
| 4,758,366 | 7/1988 | Parekh | 252/68 |
| 4,858,465 | 8/1989 | Molina | 73/104 |
| 5,149,453 | 9/1992 | Parekh | 252/68 |
| 5,202,318 | 4/1993 | Berger et al. | 514/211 |
| 5,235,045 | 8/1993 | Lewis et al. | 534/560 |
| 5,279,967 | 1/1994 | Bode | 436/56 |
| 5,308,773 | 5/1994 | Lewis et al. | 436/73 |
| 5,357,782 | 10/1994 | Henry | 73/40.7 |
| 5,378,385 | 1/1995 | Thomas et al. | |
| 5,420,136 | 5/1995 | Lewis | 514/296 |
| 5,421,192 | 6/1995 | Henry | 73/40.7 |
| 5,447,647 | 9/1995 | Ishida et al. | |
| 5,486,302 | 1/1996 | Short | |
| 5,512,198 | 4/1996 | Sasaki et al. | |
| 5,547,593 | 8/1996 | Sanechika et al. | |
| 5,560,855 | 10/1996 | Hinton | 252/68 |
| 5,565,129 | 10/1996 | Tanaka et al. | |
| 5,616,812 | 4/1997 | Egawa et al. | |
| 5,650,563 | 7/1997 | Cooper et al. | |
| 5,858,930 | 1/1999 | Desai et al. | 508/261 |

*Primary Examiner*—Margaret Medley
*Attorney, Agent, or Firm*—Wayne E. Nacker; Thomas D. Rogerson

[57] ABSTRACT

A dye composition has the formula:

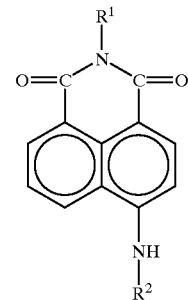

where $R^1$ and $R^2$ are the same or different and are selected from (A) $C_2$–$C_{12}$ alkyloxyalkyl, and (B) $C_{9-12}$ alkyl, (A) comprising from about 30 to 80 mole % of the R groups, (B) comprising 20 to about 70 mole % of the R groups. The dye composition is useful as a fluorescent tracer in refrigerant lubricants of the polyol ester types used in non-Freon refrigerants.

5 Claims, No Drawings

FLUORESCENT TRACER DYES

BACKGROUND OF THE INVENTION

To detect leaks in refrigeration systems, it is customary to provide fluorescent tracer dyes to refrigerant lubricants. Formerly, the refrigerant of choice was Freon which tolerated petroleum-based lubricants, in particular mineral oil. However, environmental concerns about the ozone-depleting nature of Freon has required alternative Freon-free refrigerating and air-conditioning system, e.g., such as refrigerant gases sold under the tradenames R-134 and R-134a. Due to this change, special components, gaskets, seals, etc. are required, particularly in automotive applications. These systems are incompatible with petroleum-based lubricating systems.

Alternative lubricants for Freon-free system are polyalkylene glycols and polyol esters. These are marketed by various companies, e.g. under trade names of Castrol SW20, Castrol AC flush and Mobile EAL 22. Most recently polyol esters have become the lubricants of choice for the industry. Up to this point, however, satisfactory dye molecules, which have liquid stability as a concentrate, have not been available. Dye manufacturers have unsuccessfully attempted to fluidize Solvent Yellow 43, a dye which is used for use in plastics, but has insufficient solubility in refrigerant lubricants for leak detection purposes.

Due to the sensitive nature, both environmentally and functionally, of refrigeration systems, the industry desires a fluorescent liquid colorant soluble in polyol ester type lubricants without the use of co-solvents. Formulating with co-solvents, particularly of an aromatic nature, may or may not help the liquid of a solid dye, such as C.I. Solvent 43, but this does not meet the stringent requirements of the industry.

Published PMN for Morton Yellow 10160 describes compounds having the formulae:

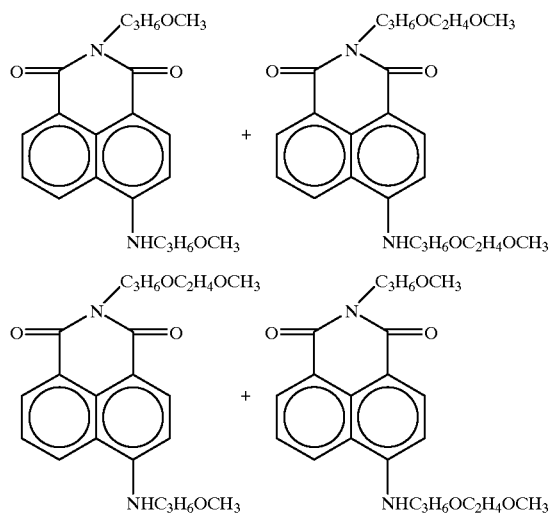

U.S. Pat. No. 5,858,930, the teachings of which are incorporated herein by reference describes dyes useful for refrigerant lubricants having the general formula:

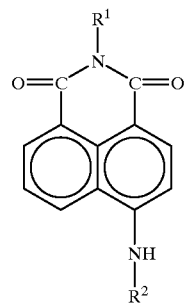

wherein $R^1$ and $R^2$ are each independently selected from branched alkyl groups containing 7 to 8 carbon atoms and alkyloxyalkyl groups containing 4 to 24 carbon atoms. These compositions are found to be weaker than desired and less stable than desired.

SUMMARY OF THE INVENTION

In accordance with the invention there is provided a napthylimide dye composition having the formula:

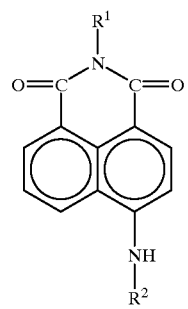

where $R^1$ and $R^2$ are the same or different and are selected from (A) $C_2$–$C_{12}$ alkyloxyalkyl, and (B) $C_{9-12}$ alkyl, (A) comprising from about 30 to 80 mole % of the R groups, (B) comprising 20 to about 70 mole % of the R groups in a mixture of compounds of the above formula. Preferably the alkyloxyalkyl moiety has 3–8 carbons. Preferably (B) is $C_9$ alkyl, most preferably isononyl. Solutions of the dye composition in polyol ester lubricants of at least about 20 wt %, preferably at least about 25 wt % are achievable.

Surprisingly, when (B) has at least 9 carbon atoms, both strength and stability are meaningfully enhanced relative to the compounds of above-referenced U.S. Pat. No. 5,858,930, which disparages the use of isononyl.

DETAILED DESCRIPTION OF CERTAIN PREFERRED EMBODIMENTS

Synthesis of the dye composition is by reaction of 4-halo, 1,8 naphthalic anhydride, preferably 4-chloro, 1,8 naphthalic anhydride with an alkyloxyalkylamine or a mixture of an alkyloxyalkylamine and an alkylamine. The alkyl and alkylene groups may be straight or branched. Preferably, the molar ratio of alkyloxyalkylamine and alkyl amine is between about 2:1 and about 1:2, most preferably in the range of about 1:1.

The alkyloxyalkyl group preferably contains 1–12 carbon atoms, more preferably 3–8 carbon atoms. The alkyloxyalkyl groups may contain multiple ether linkages. Typical examples of alkyloxyalkyl groups include 2-ethylhexyloxypropy, methyloxypropyl, propyloxypropyl, 4-ethylhexyloxyethyl, methyloxyhexyloxypropyl and the like. A preferred alkyloxyalkylamine for forming the dye is methoxypropylamine. The preferred alkylamine for forming the dye is isononylamine. The currently preferred dye composition is prepared from a 1:1 molar ratio of methoxypropylamine and isononylamine.

The dye compositions of the present invention are generally soluble in polyol esters at levels of 20 wt % and above, most being soluble at levels of 25 wt % or above. The high solubility in polyol esters is seen as very commercially attractive for reasons of shipping and storage efficiencies. Importantly, the dye compositions of the present invention are insoluble in water because refrigerant systems must be moisture-free to avoid water, and water-insolubility helps to ensure that the dye does not retain moisture. When used in a refrigeration system, the dye concentrate is diluted to bring the dye to an end-use concentration as required by the end-user.

The dye compounds can be used in various oil and lubricant compositions as a dye for identification purposes, aesthetic reasons, or leak detection. Preferably the dye is used in a refrigerant lubricant. This includes the conventional refrigerant lubricants based on mineral oils or other hydrocarbon compounds as well as the new refrigerant lubricants. The term "new refrigerant lubricants" refers to the lubricant compositions formulated to accommodate non-chlorine-containing refrigerants. Preferably the new refrigerant lubricants are "R-134a lubricants", meaning that the refrigerant R-134a (1,1,1,2-tetrafluoroethane) is fully miscible and compatible (no phase separation) with the lubricant over a temperature range of from 20° C. to 50° C. at essentially all mixing ratios, such as from 1/99 to 99/1.

The refrigerant lubricant is comprised mainly or solely of natural and/or synthetic oils. The oils include naphthalenic oils such as alkyl naphthalenes; paraffinic oils; alkylated benzene oils; polyalkyl silicate oils; polyglycols such as polyalkylene glycols, polyoxyalkylene glycols and etherfied or polyol adducts thereof; esters such as polyol esters, dibasic acid esters, and polyesters; polyether polyols; polyvinyl ethers, polycarbonates; fluorinated silicones such as fluorinated polysiloxanes; perfluoroethers; and aromatic compounds with fluoroalkyloxy or fluoroalkylthio substituents. These oils are described in the following U.S. Pat. Nos. and in the references cited therein: 5,447,647, 5,512,198, 5,486,302, 5,616,812, 5,565,129, 5,378,385, and 5,547,593. Specific oils include polyethylene glycol esters such as RETRO 100 (which is a blend of polyethylene glycol esters) sold by Castrol Industrial North America, Inc.

The lubricant may be a mixture of two or more oils and may further contain other additives as is conventional in the art.

The liquid dye compounds are readily miscible with the refrigerant oil or lubricant composition and can be directly added thereto. The amount of the dye compound contained in the lubricant of the present invention is determined by the amount of fluorescent response desired. Generally the dye compound is contained in an amount of from about 100 ppm to 800 ppm, preferably from 150 ppm to 600 ppm and most preferably from 250 ppm to 400 ppm. If the dye concentration is too low, then the total fluorescent response will not be bright enough thereby rendering visual identification of the leak difficult. An excessively high concentration of the dye is wasteful and could potentially increase the chance of the dye falling out of solution at cold temperatures. The dye should be stable in the lubricant composition and preferably does not crystallize or freeze out of the liquid lubricant composition above −25° C.

Although the dye compound is a liquid and thus can be added directly to the oil or lubricant composition, it is sometimes desirable to dilute the pure liquid compound with an appropriate solvent such as a high boiling point organic solvent.

The high boiling point organic solvents useful for diluting the dye compounds are those which exhibit a boiling point (or flash point) above 65° C. and will not adversely effect a refrigerant composition or system, i.e., they are inert. Typically the dilution solvent is an aromatic hydrocarbon although any of the above mentioned oils can be used as the dilution solvent. Preferred dilution solvents include naphthalenic oils, paraffinic oils, alkylated benzene oils, and polyalkyl silicate oils. Alkyl naphthalenes are particularly preferred as the dilution solvent.

The amount of dilution depends in part on the fluorescent efficiency of the dye compound or compounds. The dilution amount in the present invention is typically such that the fluorescent response is equivalent to the fluorescent response of a 10 to 50% (w/w) Solvent Yellow 43 concentrate, more preferably a 20 to 40% concentrate. That is, the coloring component of the diluted solution, which comprises a mixture or dye compound of the above formula, is present in an amount such that the total amount of light released by fluorescence is equal to the total amount of light released by fluorescence of the stated amount (e.g. 10%) of Solvent Yellow 43 in the same solvent. Typically the actual amount of the compounds is from 15 to 70% w/w. These diluted solutions are easy to handle and transport and have excellent resistance to crystallization, even when stored for up to 12 months at 0° F. (−18° C.). Furthermore, they are immediately and instantly miscible with further refrigerant fluid and show no signs of crystallization even in the presence of trace amounts of water.

The lubricant composition can be combined with a refrigerant in the usual manner and used in a refrigeration system. The refrigerants include fluorocarbons (meaning perfluoro- or hydrofluorocarbon) such as R-134a, and chlorofluorocarbons such as 1,1-dichloro-1,1-difluoromethane.

Fluorocarbons are preferred due to environmental factors.

The invention will how be described in greater detail by way of specific example.

EXAMPLE 1

| Preparation of Mixed isononyl/3-methoxypropyl amino naphthylimide composition | |
|---|---|
| To a 500 gal. kettle was charged: | 300 lbs. isobutyl alcohol |
|  | 25 lbs. propylene glycol |
|  | 1 lb. cupric acetate. |
| Agitation was begun and the kettle further charged with: | 45 lbs. sodium acetate powder |
|  | 116 lbs. 4-chloro, 1,8 napthalic anhydride. |
| Over 30 minutes was added: | 67 lbs. 3-methoxypropyl amine |
|  | 108 lbs. isononyl amine. |

The kettle was maintained below 40° C. during amine addition, the reaction exhibiting a slight exotherm. Once all the amine was added, the kettle was steam heated to a temperature of 105–110° C. and the reaction refluxed at this temperature for 30 minutes. Following a 24 hold at 70° C., there was added:

72 gal. water 40 lbs hydrochloric acid.

The mixture was heated to 80° C. 5 pounds of tretolite 330- was added. The mixture was agitated for two minutes and let sit for 30 minutes. The water phase was removed. Next, 72 gallons of water were added with agitation, the mixture heated to 80° C., and 5 pounds of tretolite 3300 added. Agitation was stopped and the mixture let stand for 30 minutes. The water phase was separated. The organic phase was stripped and dried to 120° C. and cooled immediately to 90° C. 200 lbs Mobil EAL 22 POE solvent was added and the mixture stirred for 15 minutes. The dye solution was at 25 wt % concentration.

EXAMPLE 2 (COMPARATIVE)

A 25 wt % dye concentration was synthesized substituting ethylhexyl amine ($C_8$ amine) for isononyl amine according to the method of Example 1. Both dye compositions were stored at 0° C. The isononyl composition was stable. Crystallization was observed in the ethylhexyl composition after 14 days.

What is claimed is:

1. A dye composition comprising a mixture of dye compounds having the formulae:

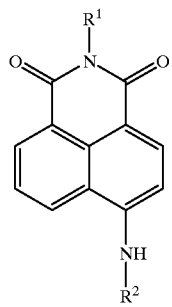

wherein $R^1$ and $R^2$ are the same or different and are selected from (A) $C_2$–$C_{12}$ alkyloxyalkyl, and (B) $C_{9-12}$ alkyl, wherein from about 30 to 80 mole percent of the $R^1$ and $R^2$ groups in the composition are $C_2$–$C_{12}$ alkyloxyalkyl and from about 20 to 70 mole percent of the $R^1$ and $R^2$ groups in the composition are $C_9$–$C_{12}$ alkyl.

2. The composition according to claim 1, wherein (B) is a $C_9$ alkyl.

3. A polyol ester lubricant composition comprising a polyol ester lubricant and the dye composition of claim 1 dissolved in said polyol ester lubricant.

4. The polyol ester lubricant composition of claim 3 comprising at least 20 wt % of said dye composition.

5. The polyol ester lubricant composition of claim 3 comprising at least 25 wt % of said dye composition.

* * * * *